(12) United States Patent
Chiba et al.

(10) Patent No.: US 8,511,342 B2
(45) Date of Patent: Aug. 20, 2013

(54) COOLING APPARATUS OF ELECTRONIC EQUIPMENT

(75) Inventors: Masaki Chiba, Tokyo (JP); Shinji Watanabe, Tokyo (JP); Minoru Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 12/669,513

(22) PCT Filed: Jul. 28, 2008

(86) PCT No.: PCT/JP2008/063492
§ 371 (c)(1),
(2), (4) Date: Jan. 18, 2010

(87) PCT Pub. No.: WO2009/017078
PCT Pub. Date: Feb. 5, 2009

(65) Prior Publication Data
US 2010/0200204 A1  Aug. 12, 2010

(30) Foreign Application Priority Data

Jul. 30, 2007  (JP) ................................. 2007-196937

(51) Int. Cl.
*F17D 1/00* (2006.01)
(52) U.S. Cl.
USPC .................................... 137/577; 165/104.33
(58) Field of Classification Search
USPC ............... 137/177, 577; 165/104.27, 104.32, 165/104.33, 132
See application file for complete search history.

(56) References Cited

U.S. PATENT DOCUMENTS

| 2,876,923 | A | * | 3/1959 | McLane et al. | 220/4.15 |
| 3,022,053 | A | * | 2/1962 | Hoyt | 261/18.3 |
| 3,372,679 | A | * | 3/1968 | Aitken | 123/519 |
| 4,957,072 | A | * | 9/1990 | Goldowsky | 123/54.2 |
| 6,947,282 | B2 | * | 9/2005 | Hotta et al. | 361/699 |
| 2008/0173372 | A1 | * | 7/2008 | Lindblom et al. | 141/94 |

FOREIGN PATENT DOCUMENTS

| JP | 2003078271 A | 3/2003 |
| JP | 2003304086 A | 10/2003 |
| JP | 2004084958 A | 3/2004 |
| JP | 2004348649 A | 12/2004 |
| JP | 2005167224 A | 6/2005 |
| JP | 2005285947 A | 10/2005 |
| JP | 2006059903 A | 3/2006 |
| JP | 2006242479 A | 9/2006 |

OTHER PUBLICATIONS

International Search Report for PCT/JP2008/063492 mailed Oct. 7, 2008.

* cited by examiner

*Primary Examiner* — John K Fristoe, Jr.
*Assistant Examiner* — Reinaldo Sanchez-Medina

(57) ABSTRACT

In a cooling apparatus of an electronic equipment that cools down a heating element by circulating a refrigerant, air taken in once is prevented from taking in again into a water tank. A main water tank 1 includes two side surface parts 1a and 1b, and a cylindrical tubed part 1c. An inflow opening 2 is attached to a center of the side surface part 1a, and an outflow opening 3 is attached to a center of the side surface part 1b. A flexible pipe 6, which is made by a flexible material, is attached to the outflow opening 3 and a weight 7 is attached to an end of the flexible pipe 6.

8 Claims, 9 Drawing Sheets

8 SUCTION OPENING OF REFRIGERANT

COOLING APPARATUS OF ELECTRONIC EQUIPMENT

This application is the National Phase of PCT/JP2008/063492, filed Jul. 28, 2008, which is based upon and claims priority from Japanese Patent Application No. 2007-196937 filed Jul. 30, 2007.

TECHNICAL FIELD

The present invention relates to a cooling apparatus of an electronic equipment that cools down a heating element of the electronic equipment using liquid as a refrigerant, and a structure of a water tank of a liquid cooling apparatus that prevents air, especially bubbles, from flowing out.

BACKGROUND ART

In recent years, many liquid cooling systems are used to cool electronic equipments. A water cooling system is generally formed of a sealed circulating route, however a refrigerant permeates or evaporates from resin parts or rubber tubes, etc. and air is confirmed to be mixed along with the reduction of the refrigerant. If the accumulated air inside the circulation route mixes in a driving unit, the driving unit runs idle to reduce the flow rate or cause a failure. Then, the cooling efficiency is reduced, thereby possibly leading to insufficient cooling of a heating element and a failure of the apparatus itself. Therefore, in a liquid cooling system, bubbles generated in the system must be trapped before the driving unit and at the same time, a space for storing extra refrigerant (the space hereinafter referred to as a water tank) is required, and it is desirable that air trapped once will not flow into a channel again. Accordingly, water tanks have been suggested, that have the structure to prevent a refrigerant including air mixed therein from flowing out (for example patent documents 1 and 2).

Patent document 1 discloses a method to fix a suction opening of a refrigerant to the center of a water tank so that air will not be mixed in the refrigerant flowing out from the suction opening. With this structure, as long as remaining amount of the refrigerant is half or more of the water tank, the suction opening is always under the liquid level in any direction the corresponding electronic apparatus is used, thus air will not flow out the water tank.

Further, patent document 2 suggests a structure in which a gas accumulated unit is formed in the part except the inner uppermost of the water tank so that air will not be mixed in the refrigerant flowing out of the water tank.

[Patent Document 1]
Japanese Unexamined Patent Application Publication No. 2003-78271
[Patent Document 2]
Japanese Unexamined Patent Application Publication No. 2005-285947

DISCLOSURE OF INVENTION

Technical Problem

However, there is a problem that long time use is difficult in the methods disclosed by patent documents 1 and 2. This is because that in a liquid cooling system, a refrigerant is permeated and evaporated in a tube or the like that is used in the liquid cooling system, thus it is difficult to eliminate the reduction of the refrigerant, however in the cooling apparatus disclosed in patent document 1, an outflow opening is fixed to the center of the water tank, so only about a half of the refrigerant stored in the water tank can be used, and the cooling apparatus disclosed in patent document 2 cannot store air more than the capacity of a relatively small capacity gas accumulated unit. A solution can be considered for this issue, which is to increase the volume of the water tank, however it also leads to increase the size of the apparatus.

Further, in the water tank disclosed in patent document 1, if a refrigerant inflow opening is positioned below the outflow opening, it is highly possible that bubbles discharged from the inflow opening are taken in again from the outflow opening. Moreover, if the refrigerant inflow opening is positioned in the upper part of the water tank and the refrigerant is discharged from the inflow opening to air, bubbles generated when the refrigerant is dropped in and collided against the water surface are sucked from the outflow opening. In the related art disclosed by patent document 2, in the exemplary embodiment in which an outflow opening of the water tank is opened near the inflow opening, there is high possibility that bubbles discharged from the inflow opening are taken in again from the outflow opening.

The purpose of the present invention is to solve the problem of the above related arts, and the present invention aims to provide a cooling apparatus that can be used for a long time (or can be miniaturized) and has a structure that the bubbles hardly leak outside the water tank.

Technical Solution

To achieve the above purpose, the present invention provides a cooling apparatus of an electronic equipment that includes a driving mechanism that drives a refrigerant, a refrigerant tank that stores the refrigerant, where an inflow opening for the refrigerant to flow in and an outflow opening for the refrigerant to flow out being provided to the refrigerant tank, and a pipe body that connects the driving mechanism and the refrigerant tank to form a ring. The refrigerant tank includes a side surface to an opposite side of the outflow opening, and a refrigerant guide pipe, having one end positioned near the side surface and also near a deepest part in a direction of an action of gravity by the action of gravity and another end connected to the outflow opening, that derives the refrigerant from inside the refrigerant tank to the outflow opening.

Advantageous Effects

According to the present invention, as the suction opening of the refrigerant turns to the gravity direction in any rotation of the outflow opening axial direction of the water tank in case of a movement of an equipment or a change of installation orientation, the suction opening can be positioned near the bottom of the water tank, and thus enabling to increase the amount of available refrigerant and extend the usage period. Or the size of the water tank can be reduced. Further, as the suction opening is positioned near the bottom of the water tank, bubbles flowed into the water tank or bubbles generated by a collision of an inflow fluid against the liquid surface can be flowed to the direction away from the suction opening. This enables to reduce the possibility of discharging the bubbles outside the water tank.

EXPLANATION OF REFERENCE

Figure 1:
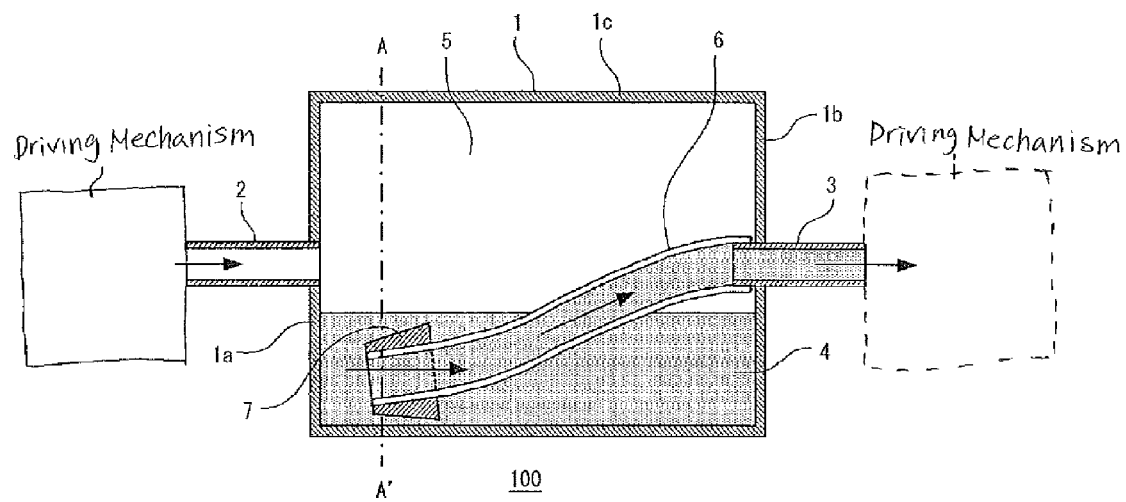
FIG. 1 is a cross-sectional diagram illustrating the structure of a water tank according to a first exemplary embodiment of the present invention.

1 . . . Main water tank
1a, 1b . . . Side surface part
1c . . . Tubed part
1d . . . Domed side surface part
1e . . . Coned wall part
2 . . . Inflow opening
3 . . . Outflow opening
4 . . . Refrigerant
5 . . . Air
6 . . . Flexible pipe
6a . . . Opening
6b . . . Projection
7 . . . Weight
7a . . . Projection
8 . . . Suction opening for refrigerant
9 . . . Water tank inner wall
10 . . . Gravity pipe
11 . . . Connection unit
12 . . . Connection unit
13 . . . Domed wall surface
14 . . . Coned wall surface
15 . . . Water supply opening
16 . . . Cover
17 . . . Projection direction of projector equipment
100 . . . Water tank

BEST MODE FOR CARRYING OUT THE INVENTION

Hereafter, exemplary embodiments of the present invention are described in detail with reference to the drawings.

First Exemplary Embodiment

FIG. 1 is a cross-sectional diagram illustrating a water tank of a cooling apparatus according to the first exemplary embodiment of the present invention. Arrows in the drawings indicate the flow direction of a refrigerant. A water tank 100 is made up of multiple components including a main water tank 1, which are not bound to enable a refrigerant (water, an antifreeze solution, etc.) to be added. The main water tank 1 includes two opposing side surface parts 1a and 1b, and a cylindrical tubed part 1c. An inflow opening 2 and an outflow opening 3 are provided to the center of the side surface parts 1a and 1b, respectively. The inflow opening 2 and the outflow opening 3 are connected to a driving unit (pump) via pipe bodies respectively and to a sealed a cooling apparatus, and a refrigerant circulates inside the cooling apparatus by the driving unit. A refrigerant 4 which flowed inside the water tank from the inflow opening 2 remains inside the water tank once, and then flows out of the water tank from the outflow opening 3. The refrigerant 4 is accumulated in the bottom part of the water tank and air 5 is accumulated in the upper part.

A flexible pipe 6, which is made by a flexible and moderately rigid material, is placed inside the water tank with one end connected to the outflow opening 3, and a weight 7 is attached to another end of the flexible pipe 6. Then a suction opening 8 of the end part of the flexible pipe 6 is always positioned to the deepest part of the water tank even if the water tank is rotated about an axis, which is the line passing through the center of the inflow opening and the outflow opening, and bubbles flowed into the water tank or generated in the water tank move upward, thus there is less possibility that the suction opening 8 sucks out the bubbles. Note that FIG. 1 illustrates the state in which the refrigerant 4 is reduced by more than half of the capacity of the water tank. The refrigerant 4 is filled to nearly full at first in the water tank but reduced by permeating and evaporation, etc. The present invention enables the cooling apparatus to fulfill the functions even if the refrigerant 4 is reduced as illustrated in the drawing.

It is desirable that the flexible pipe 6 is formed by a resin material that has flexibility and rigidity, that prevents from clogging a channel when the flexible pipe is narrowed, and also stability that will not dissolve after being soaked in the refrigerant 4 for a long time. Suppose that the length of the flexible pipe 6 is shorter than the distance from the outflow opening 3, where the flexible pipe 6 is attached thereto, to the farthest end of the water tank inner wall, and also longer than a radius of the side surface 1a (1b) of the main water tank 1.

Figure 2:
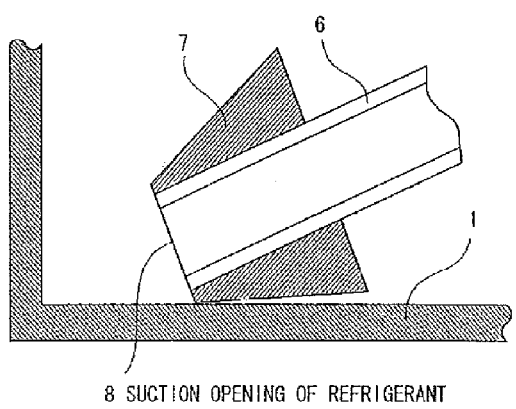
FIG. 2 is an enlarged cross-sectional diagram near a suction opening according to the first exemplary embodiment of the present invention.

The weight 7 has a hole for the refrigerant to run through and is hung down from the flexible pipe 6 and immersed in the refrigerant 4. The weight 7 is desirably formed by a material (metal, metal compound, or resin compound) that is hardly dissolved or corroded even after being soaked in the refrigerant 4 for a long time, and not crushed even by a collision to the wall surface of the water tank. FIG. 2 is an enlarged cross-sectional diagram of the weight 7. The shape of the weight 7 preferably has a few corners like cone, sphere, or cylindrical and is rotational symmetric. Further, it is preferable that the cross-section area becomes smaller to the end of the flexible pipe 6, like a cone. This enables the weight 7 to smoothly slide on the water tank inner wall and also the suction opening 8 to tilt to the water tank inner wall.

By combining the flexible pipe 6 and the weight 7, the flexible pipe 6 can be bent near the outflow opening 3 by a gravity action and the suction opening 8 can always be sunk near the bottom of the refrigerant 4. Further, this enables to realize a cooling apparatus that keeps flowing a large amount of a refrigerant in or out of the water tank as the rigidity of the flexible pipe 6 suppresses the channel of the refrigerant from being narrowed.

Figure 3:
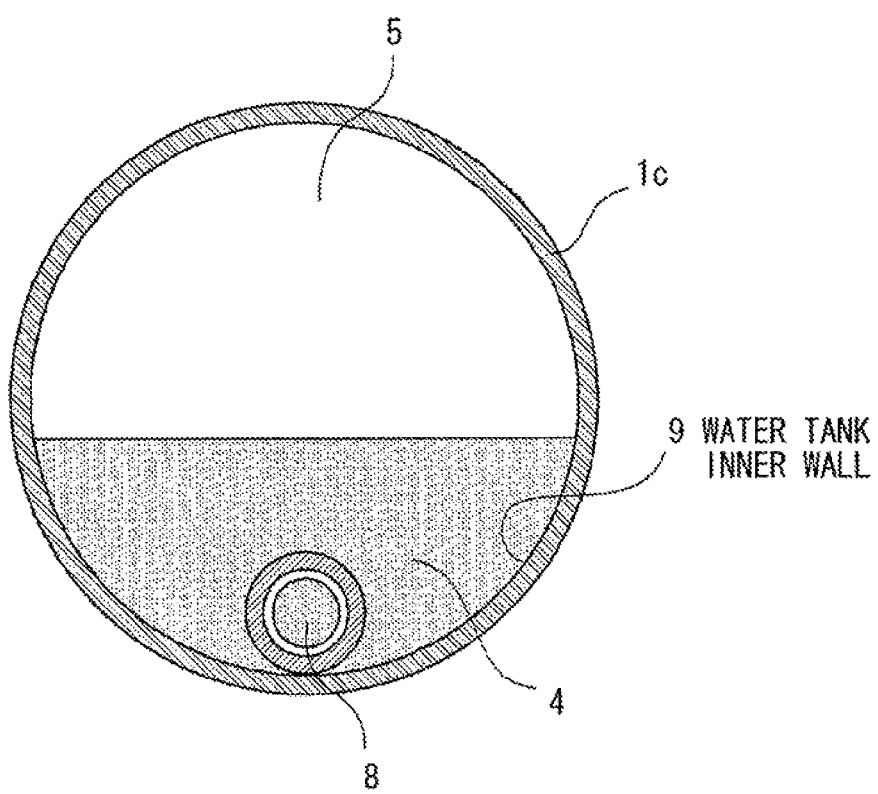
FIG. 3 is a cross-sectional diagram taken along the line A-A' of FIG. 1.
Figure 4A:
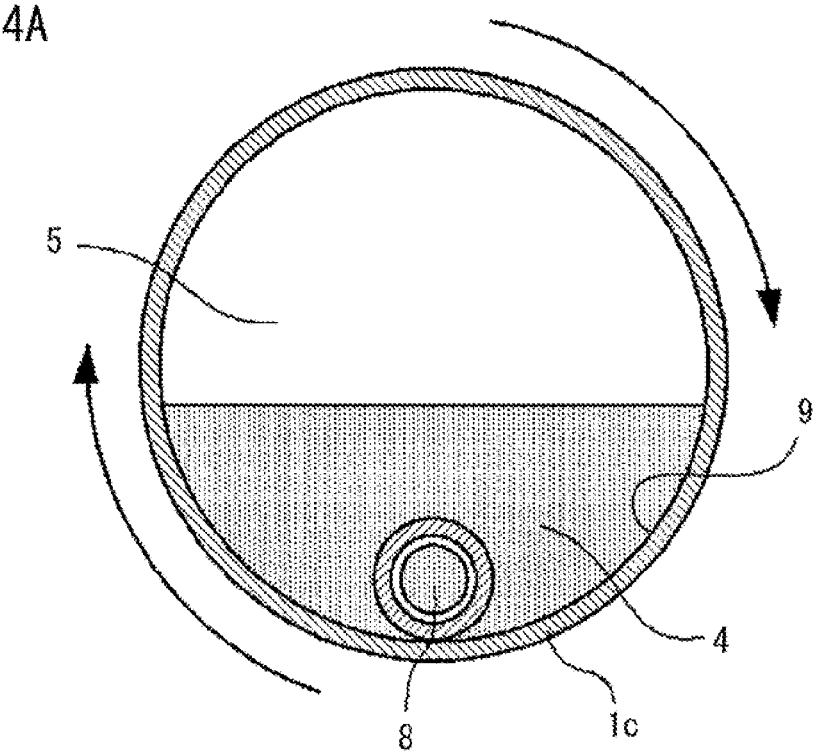
FIG. 4A illustrates a movement of the suction opening corresponding to a rotation of the water tank according to the first exemplary embodiment of the present invention.
Figure 4B:
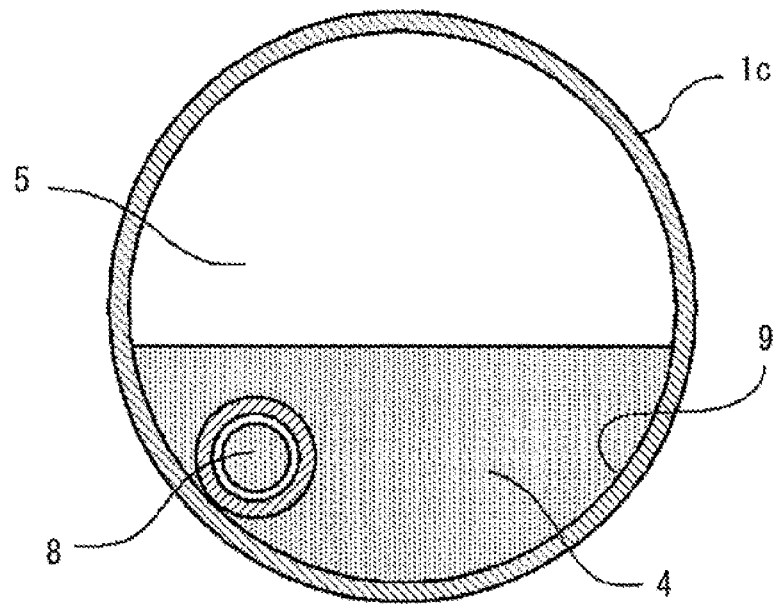
FIG. 4B illustrates a movement of the suction opening corresponding to a rotation of the water tank according to the first exemplary embodiment of the present invention.
Figure 4C:
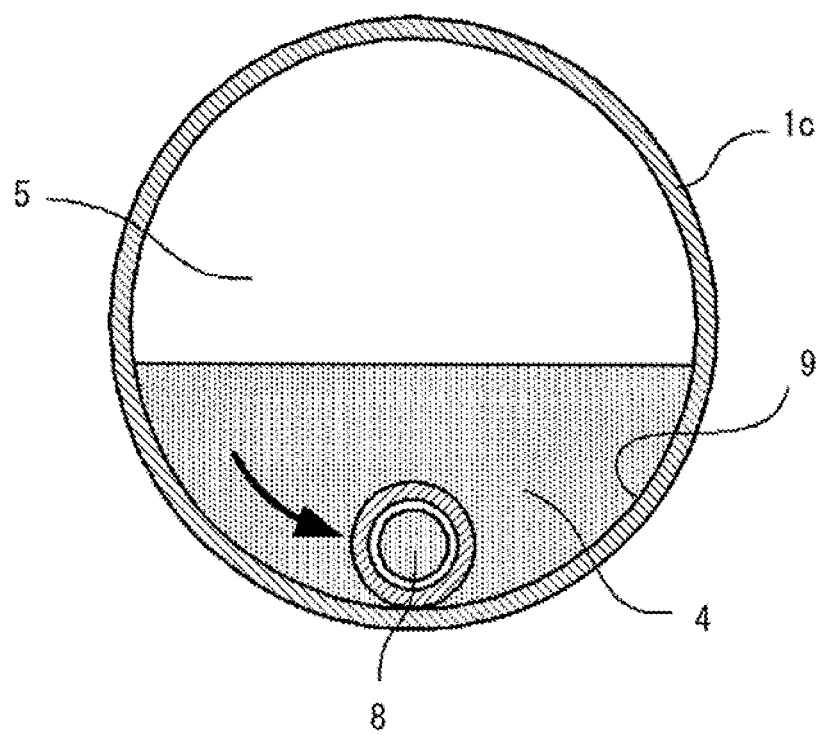
FIG. 4C illustrates a movement of the suction opening corresponding to a rotation of the water tank according to the first exemplary embodiment of the present invention.

FIG. 3 is a cross-sectional diagram taken along the line A-A' of FIG. 1. There is a little unevenness on the water tank inner wall 9 and the water tank inner wall 9 is rotational symmetric about an axial direction of the outflow opening. This eliminates the anisotropy for axial rotation in the direction of the outflow opening, and enables the suction opening 8 to always sink to the bottom of the refrigerant 4 without interrupting the movement of the suction opening 8 regardless of which part of the inner wall turns to the gravity direction. FIGS. 4A to 4C explain this operation. Even if the water tank performs a rotational movement about the center of the outflow opening 3 as a center axis (FIG. 4A), and the refrigerant 4 stored in the water tank moves toward the gravity direction after the rotation along with the rotation (FIG. 4B), the suction opening 8 can also move to the gravity direction by the action of the weight (FIG. 4C). As a result, the suction opening 8 can always be sunk in the refrigerant 4 even under the circumstance that the refrigerant is reduced, and only the refrigerant 4 not including bubbles can be discharged, thereby enabling to maintain favorable cooling capability.

Although the water tank of this exemplary embodiment has a cylindrical shape, it is not necessarily this shape but may be any shape that is rotational symmetric about the center of the inflow/outflow openings, and it may be polygonal columnar shape. Further, in this exemplary embodiment, the inflow opening and the outflow opening are attached to the opposing side surface parts, however they may be attached to the center part of the same side of the side surface parts. These apply to the following exemplary embodiments.

Second Exemplary Embodiment

Figure 5:
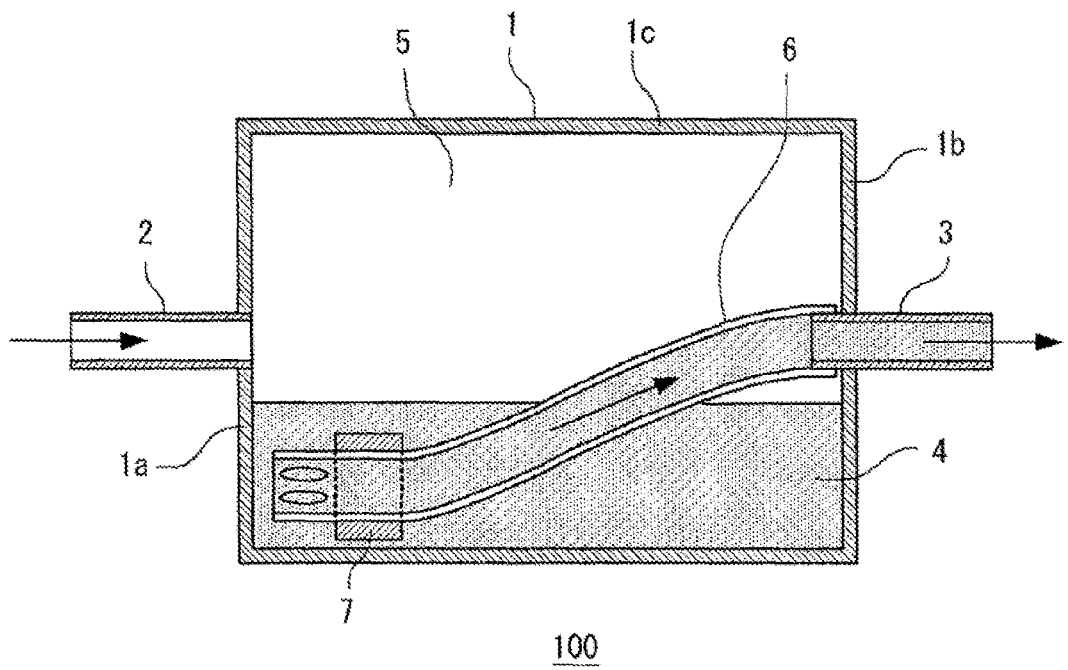
FIG. 5 is a cross-sectional diagram illustrating the structure of a water tank according to a second exemplary embodiment of the present invention.
Figure 6:
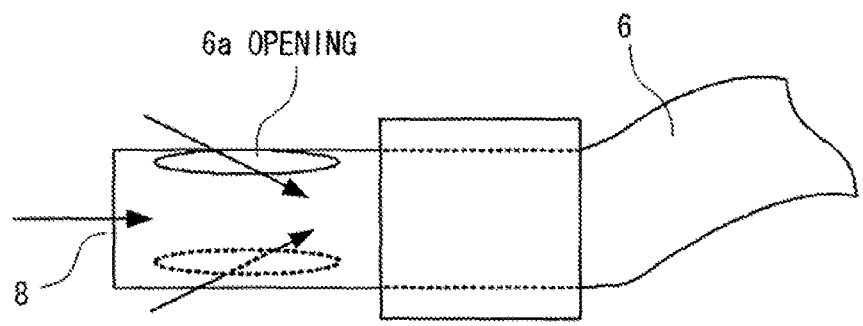
FIG. 6 illustrates an end of a flexible pipe according to the second exemplary embodiment of the present invention.

FIG. 5 is a cross-sectional diagram illustrating a water tank according to a second exemplary embodiment of the present invention. In the drawings illustrating the second exemplary embodiment or later, components identical to those in the first exemplary embodiment illustrated in FIG. 1 are denoted by reference numerals identical with duplicated description omitted as appropriate. The only difference from the water tank of the first exemplary embodiment illustrated in FIG. 1 is the configuration of the flexible pipe 6 and the weight 7, thus this point is explained hereinafter. As for the water tank 100 of this exemplary embodiment, a part of the end part of the flexible pipe 6 is projected and the circular weight 7 is attached to the flexible pipe 6. Then, as illustrated in FIG. 6 which is an enlarged side view of the flexible pipe 6, an opening 6a for taking in a refrigerant is provided to the side surface of the end part of the flexible pipe 6. Therefore, the refrigerant is taken in not only from the suction opening 8 at the end but from the opening 6a of the side surface, and transported inside the flexible pipe 6.

Figure 7:
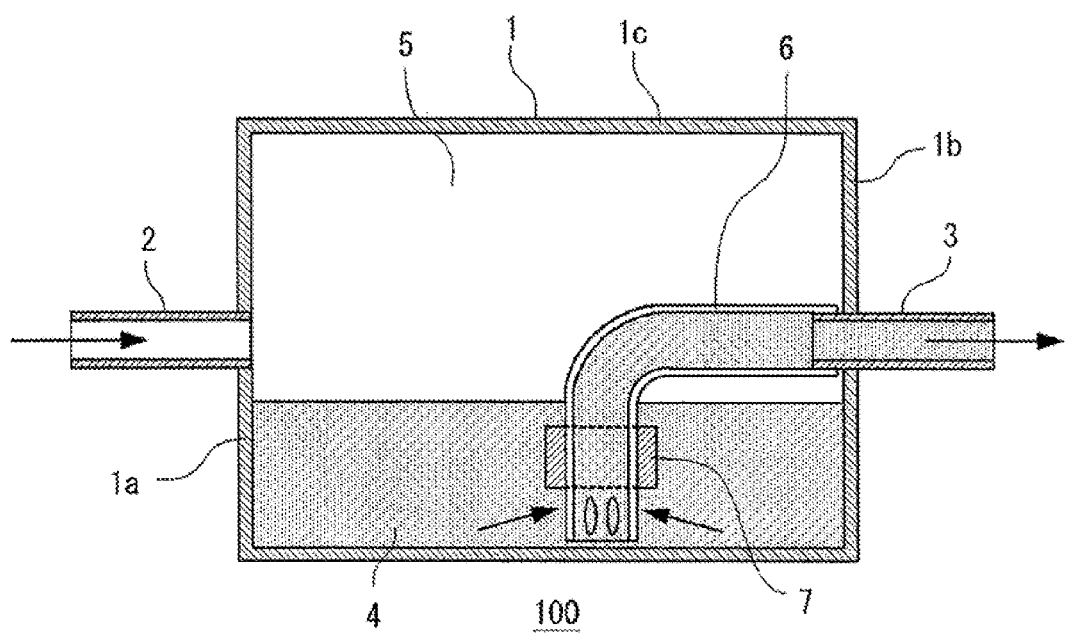
FIG. 7 illustrates the status in which the end of the flexible pipe is clogged according to the second exemplary embodiment of the present invention.

If water is taken into the water tank only from the suction opening 8, which is provided to the end of the flexible pipe 6, there is a possibility that the flexible pipe 6 sticks to the water tank inner wall by its sucking power, as illustrated in FIG. 7, when the water tank rotates rapidly. This exemplary embodiment enables to suck the refrigerant 4 from the opening 6a which is opened to the side surface of the flexible pipe 6 even in such situation and maintain favorable cooling capability. Furthermore, even in the situation illustrated in FIG. 7, the absorption power of the flexible pipe 6 against the wall surface inside the water tank is weaker than when the opening 6a does not exist, thus by giving a vibration to the water tank (electronic equipment), the water tank can be returned to the state illustrated in FIG. 5 by the rigidity possessed by the flexible pipe 6.

Figure 8A:
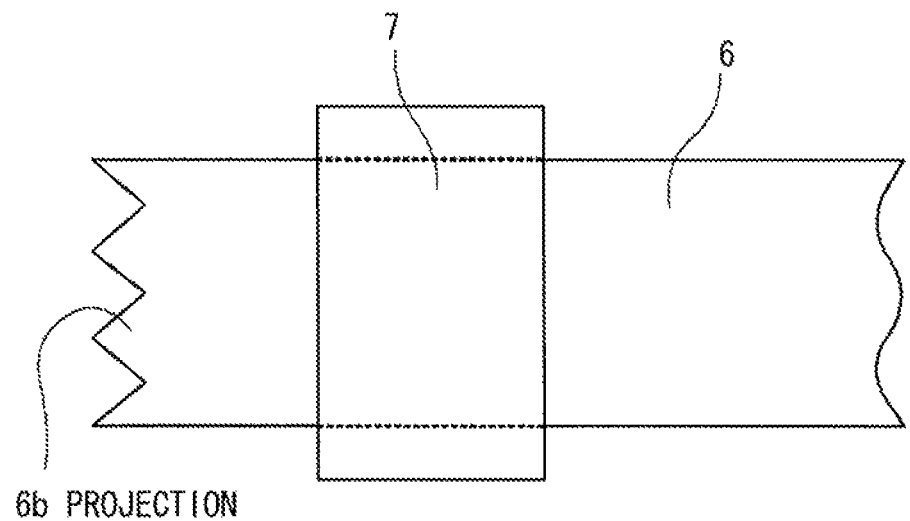
FIG. 8A illustrates a modification example of the second exemplary embodiment of the present invention.
Figure 8B:
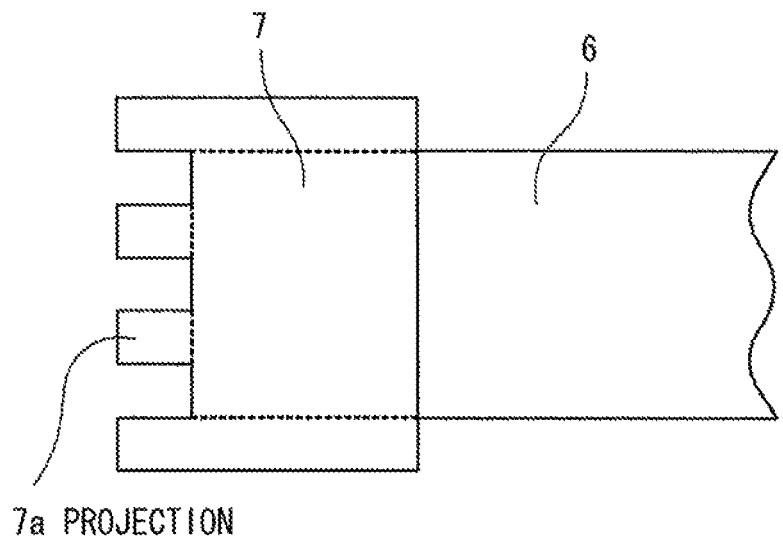
FIG. 8B illustrates a modification example of the second exemplary embodiment of the present invention.

FIGS. 8A and 8B are the side views illustrating modification examples of the second exemplary embodiment. In the example illustrated in FIG. 8A, a part of the flexible pipe 6 is projected from the weight 7, and the end part of the flexible pipe 6 is processed to be uneven so that a projection 6b is formed to the end part. In the example illustrated in FIG. 8B, the end part of the flexible pipe 6 is within the weight 7, and the end part of the weight 7 is processed to be uneven so that a projection 7b is formed. In both of the modification examples, a refrigerant can be sucked from the side surface parts other than the suction opening of the end, and the same effects as the second exemplary embodiment can be achieved.

Third Exemplary Embodiment

Figure 9:
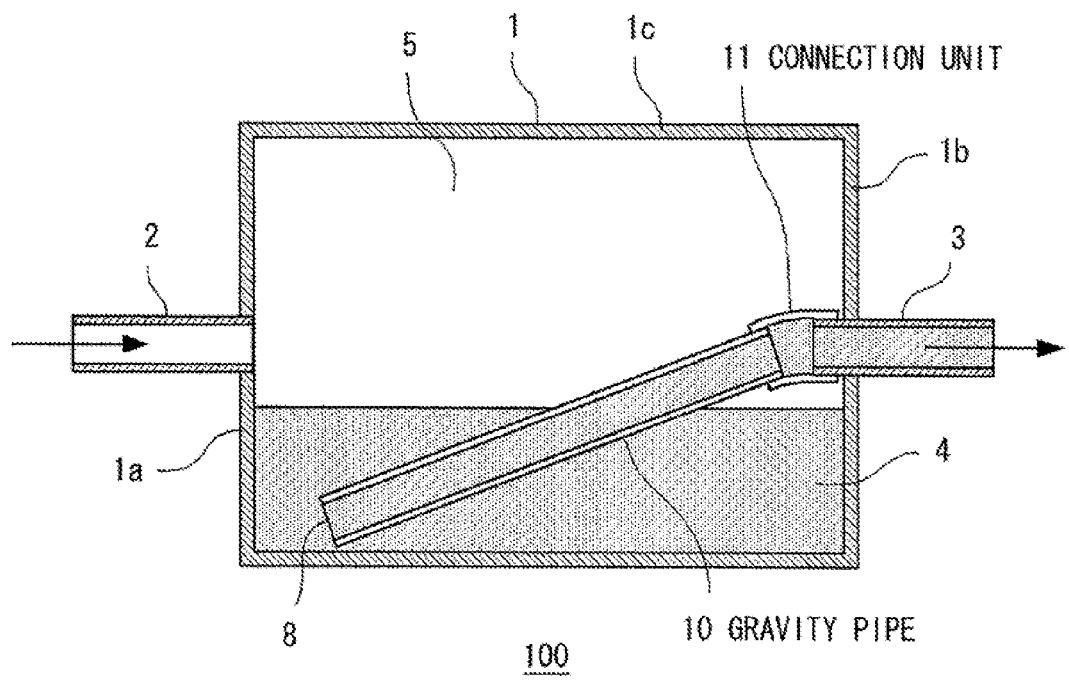
FIG. 9 is a cross-sectional diagram illustrating the structure of a water tank according to a third exemplary embodiment of the present invention.

FIG. 9 is a cross-sectional diagram illustrating an overview of a water tank according to a third exemplary embodiment of the present invention. The difference from the water tank of the first exemplary embodiment illustrated in FIG. 1 is that a gravity pile 10 is used instead of the flexible pipe as a pipe to take in a refrigerant, and the gravity pipe 10 is attached to the inflow opening 3 by a connection point 11, thus the difference point is described hereinafter. The gravity pipe 10 is formed by a highly rigid material with a specific gravity of 1 or more. The connection unit 11 is formed form a flexible resin material, so that the gravity pipe 10 can be bent against the outflow opening 3 to be held by the outflow opening 3. Therefore, an end (suction opening) 8 of the gravity pipe 10 tilts to the gravity direction by its own weight, thus the suction opening 8 is always positioned near the bottom of the refrigerant 4.

The gravity pipe 10 is preferably formed by a metal material that does not corrode even after being soaked into the refrigerant 4 for a long time. Suppose that the length of the gravity pipe 10 is shorter than the distance from the outflow opening 3 to the farthest water tank inner wall. The connection unit 11 is also preferably formed by a material that does not dissolve and corrode even after being soaked into the refrigerant 4 for a long time.

The corners of the end part of the gravity pipe having the suction opening 8 are preferably chamfered. As with the first exemplary embodiment illustrated in FIG. 3, the water tank inner wall 9 is a little uneven and rotational symmetric about the axis direction of the outflow opening. This eliminates the anisotropy for axial rotation in the direction of the outflow opening, and enables the suction opening 8 to always sink to the bottom of the refrigerant 4 without interrupting the movement of the suction opening 8 regardless of which part of the inner wall turns to the gravity direction. Accordingly, this exemplary embodiment also enables to prevent from sucking bubbles from the suction opening 8 and discharge only the refrigerant outside the water tank, thereby enabling to maintain favorable cooling capability for a long time.

Fourth Exemplary Embodiment

Figure 10:
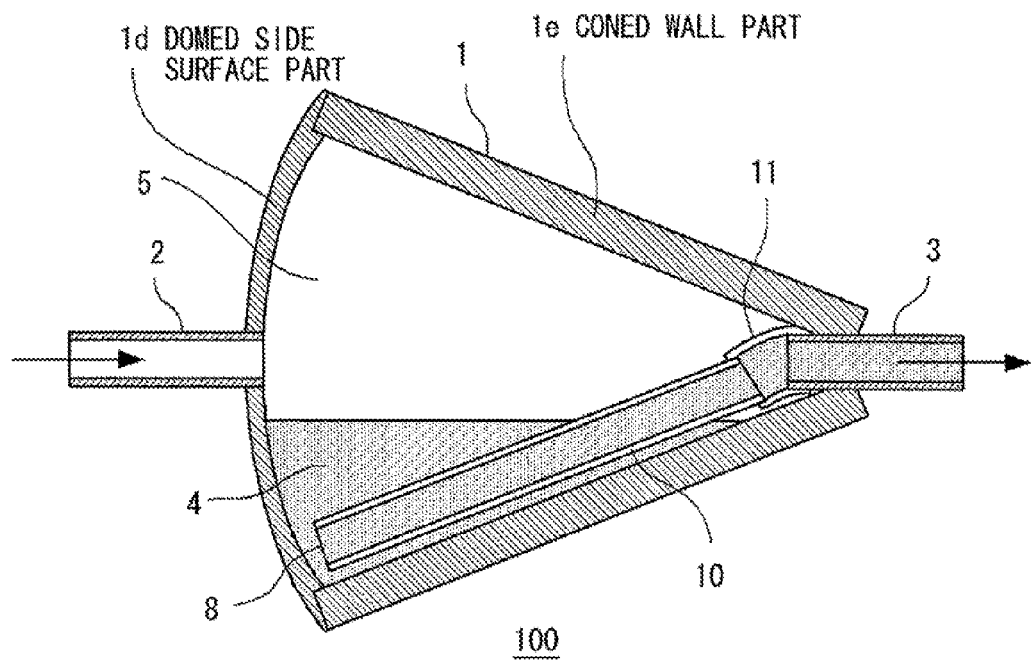
FIG. 10 is a cross-sectional diagram illustrating the structure of a water tank according to a fourth exemplary embodiment of the present invention.

FIG. 10 is a cross-sectional diagram illustrating an overview of a water tank according to a fourth exemplary embodiment of the present invention. The difference from the water tank of the third exemplary embodiment illustrated in FIG. 9 is that the main water tank 1 has a cone shape and the other points are same as the third exemplary embodiment, thus the main water tank 1 is described hereinafter. The main water tank 1 includes a spherical shape domed wall surface part 1$d$ and a cone shape coned wall part 1$e$, which is bound to the domed wall surface part 1$d$. Then the inflow opening 2 is attached to the center of the domed wall part 1$d$, and the outflow opening 3 is attached to the top of the coned wall part 1$e$.

Also in this exemplary embodiment, the suction opening 8 of the gravity pipe 10 can always be sunk to the bottom of the refrigerant, thus it is possible to prevent the suction opening 8 from sucking bubbles and discharge only the refrigerant outside the water tank, thereby enabling to maintain favorable cooling capability for a long time. Further, according to this exemplary embodiment, same period of operation with the other exemplary embodiments can be achieved by the water tank with less refrigerant and smaller capacity, and thus contributing to miniaturize the electronic equipment.

Although the main water tank of this exemplary embodiment has a dome shaped side surface part, however it may be a vertical side surface part instead. Further, a pyramidal wall unit may be used instead of the cone shaped wall part. Moreover, the main water tank of this exemplary embodiment may be combined with the flexible pipes of the first and the second exemplary embodiments.

Fifth Exemplary Embodiment

Figure 11:
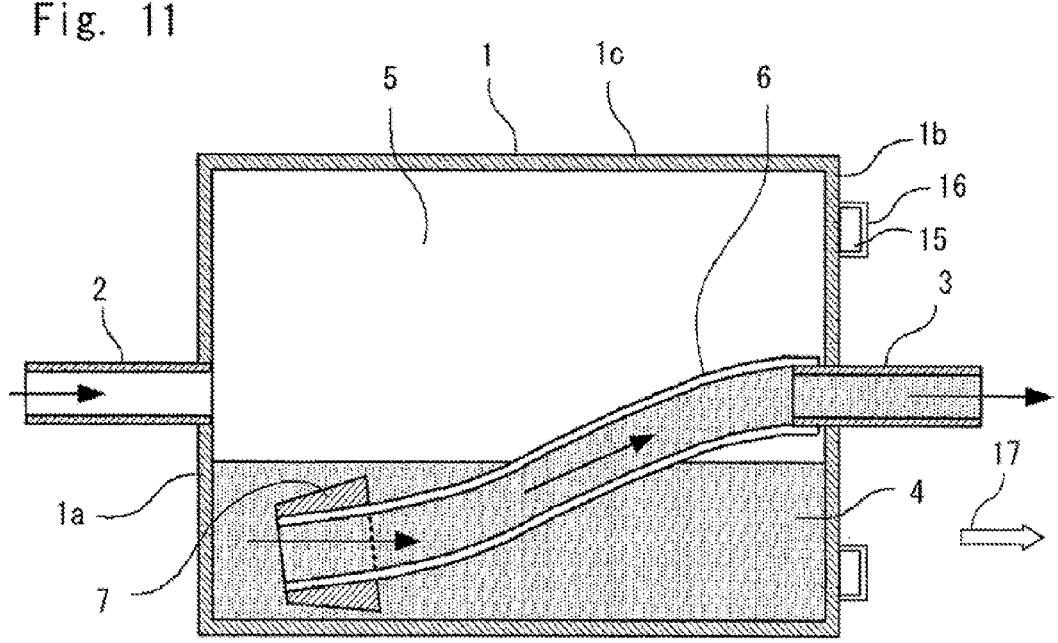
FIG. 11 is a cross-sectional diagram illustrating the structure of a water tank according to a fifth exemplary embodiment of the present invention.

FIG. 11 illustrates a water tank 1 of a cooling apparatus according to a fifth exemplary embodiment of the present invention. This cooling apparatus is built into a projector equipment, and a directional axis of the outflow opening corresponds to the center of the projection direction 17. The inflow opening 2 is connected from a liquid cooling system and the refrigerant 4 which circulated the liquid cooling system flows inside the water tank by a source of power. Similarly, the outflow opening 3 is connected to the liquid cooling system and the refrigerant stored in the water tank 1 flows out of the water tank. Water supply openings 15 are provided to the position below and above the outflow opening 3 on the line through the outflow opening 3 of the water tank 1, and sealed by a removable cover 16. With the above structure, even if the projector equipment is placed on the floor or hung from the ceiling, the refrigerant 4 can be refilled without detaching the water tank 1 from the apparatus.

INDUSTRIAL APPLICABILITY

The present invention can be applied to a cooling apparatus of an electronic equipment that cools a heating element of the electronic equipment using liquid as a refrigerant.

The invention claimed is:

1. A cooling apparatus of an electronic equipment comprising:
 a driving mechanism that drives a refrigerant;
 a refrigerant tank that stores the refrigerant, an inflow opening for the refrigerant to flow in and an outflow opening for the refrigerant to flow out being provided to the refrigerant tank; and
 a pipe body that connects the driving mechanism and the refrigerant tank to form a ring, wherein the refrigerant tank comprises:
 a side surface to an opposite side of the outflow opening,
 a refrigerant guide pipe, having one end positioned near the side surface and also near a deepest part of the refrigerant tank and another end connected to the outflow opening, that derives the refrigerant from inside the refrigerant tank to the outflow opening,
 the refrigerant guide pipe comprises a main flexible guide pipe and a weight attached to an end part of the main guide pipe, the weight having a shape such that the weight is inclined so as to be thicker from an end-part side of the refrigerant guide pipe towards an outflow-opening side of the refrigerant guide pipe in a longitudinal direction of the refrigerant guide pipe,
 the weight being thicker on the outflow-opening side as compared to an inflow-opening side opposite to the outflow-opening side, causing an end of the refrigerant guide pipe to be inclined relative to the refrigerant guide pipe and point downwards at the inflow-opening side.

2. The cooling apparatus of the electronic equipment according to claim 1, wherein the refrigerant tank comprises
 two side surfaces that are vertical to a direction for the refrigerant to flow in or out, and
 a cylindrical or polygonal tubular outer wall that couples the two side surfaces.

3. The cooling apparatus of the electronic equipment according to claim 2, wherein the inflow opening and the outflow opening are respectively placed to the two side surfaces.

4. The cooling apparatus of the electronic equipment according to claim 3, wherein the inflow opening and the outflow opening are respectively placed to a center of the side surfaces.

5. The cooling apparatus of the electronic equipment according to claim 1, wherein the refrigerant tank comprises
 a circular cone or a polygonal cone outer wall with its top located at a setting position of the outflow opening, and
 a side surface that closes the circular cone shape or the polygonal cone shape of the outer wall.

6. The cooling apparatus of the electronic equipment according to claim 5, wherein the inflow opening is placed to the side surface.

7. The cooling apparatus of the electronic equipment according to claim 6, wherein the inflow opening is placed to a center of the side surface.

8. The cooling apparatus of the electronic equipment according to claim 1, further comprising a plurality of water supply openings to positions above and below with respect to a center on a straight line running trough a center of a surface having the outflow opening or a surface having the inflow opening.

* * * * *